United States Patent [19]
Kinugasa et al.

[11] Patent Number: 5,898,165
[45] Date of Patent: Apr. 27, 1999

[54] PORTABLE STORAGE MEDIUM ISSUING SYSTEM AND ISSUING METHOD

[75] Inventors: Hiroshi Kinugasa, Chiba-ken; Miki Kawata, Kanagawa-ken, both of Japan

[73] Assignee: Kabushiki Kaisha Toshiba, Kawasaki, Japan

[21] Appl. No.: 08/759,688

[22] Filed: Dec. 6, 1996

[30] Foreign Application Priority Data

Dec. 8, 1995 [JP] Japan .................................. 7-320539
Jan. 30, 1996 [JP] Japan .................................. 8-014413

[51] Int. Cl.$^6$ .......................... G06F 17/00; G06K 5/00; G06K 7/08; G06K 19/06
[52] U.S. Cl. ......................... 235/492; 235/375; 235/380; 235/451
[58] Field of Search .................... 235/492, 375, 235/380, 451

[56] References Cited

U.S. PATENT DOCUMENTS

| | | | |
|---|---|---|---|
| 4,720,626 | 1/1988 | Nishikawa et al. | 235/449 |
| 4,745,265 | 5/1988 | Douno et al. | 235/379 |
| 4,988,855 | 1/1991 | Iijima | 235/492 |
| 5,012,074 | 4/1991 | Masada | 235/379 |
| 5,367,150 | 11/1994 | Kitta et al. | 235/380 |
| 5,440,108 | 8/1995 | Tran et al. | 235/381 |
| 5,506,397 | 4/1996 | Hoshino | 235/492 |
| 5,592,400 | 1/1997 | Sasou et al. | 235/375 |
| 5,698,836 | 12/1997 | Fujioka | 235/492 |
| 5,729,717 | 3/1998 | Tamada et al. | 235/380 |

*Primary Examiner*—Anita Pellman Gross
*Assistant Examiner*—Daniel St. Cyr
*Attorney, Agent, or Firm*—Pillsbury Madison & Sutro LLP

[57] ABSTRACT

In an issuing method of a portable storage medium having a data memory and a control element, a plurality of issue data to be written are stored in the data memory, whether the issue data are to be written into the data memory is selected for each of stored issue data and then, selected issue data only are written into the data memory of the portable storage medium.

19 Claims, 16 Drawing Sheets

FIG. 4

```
        *** MENU ***

1.  ISSUE DATA PREPARATION
   2.  ISSUE DATA DISPLAY
   3.  CARD ISSUE
   4.  SUPPORT PROCESS
   5.  END

SELECT MENU NO.
```

FIG. 5

INSERT IC CARD TO BE ISSUED INTO IC CARD READER/WRITER

|  | CARD NO. | CONFIRMATION DATA |
|---|---|---|
| NEXT CARD | 0002 | CONFIRMATION DATA 2 |
| CURRENT CARD | 0001 | CONFIRMATION DATA 1 |

F1: NEXT CARD    F2: TERMINATION

FIG. 6

```
INSERT IC CARD TO BE ISSUED INTO IC CARD READER/WRITER

CARD NO.              CONFIRMATION DATA

NEXT CARD          0003                  CONFIRMATION DATA 3

CURRENT CARD       0002                  CONFIRMATION DATA 2

F1: NEXT CARD    F2: TERMINATION
```

FIG. 7

| 0002 |
|---|
| 0005 |
|  |

FIG. 9

SELECT CARDS THAT ARE NOT TO BE ISSUED

| CARD NO. | CONFIRMATION DATA |
|---|---|
| 0001 | CONFIRMATION DATA 1 |
| 0002 | CONFIRMATION DATA 2 |
| 0003 | CONFIRMATION DATA 3 |
| 0004 | CONFIRMATION DATA 4 |
| 0005 | CONFIRMATION DATA 5 |

F1: NEXT CARD CONFIRMATION DATA GROUP

F2: PRECEDING CARD CONFIRMATION DATA GROUP

F3: DESIGNATION OF CARD THAT ARE NOT ISSUED

F4: TERMINATION

FIG. 10

INSERT IC CARD TO BE ISSUED INTO IC CARD READER/WRITER

|  | CARD NO. | CONFIRMATION DATA |
|---|---|---|
| NEXT CARD | 0003 | CONFIRMATION DATA 3 |
| CURRENT CARD | 0001 | CONFIRMATION DATA 1 |

F1: NEXT CARD    F2: TERMINATION

FIG. 11

INSERT IC CARD TO BE ISSUED INTO IC CARD READER/WRITER

|  | CARD NO. | CONFIRMATION DATA |
|---|---|---|
| NEXT CARD | 0004 | CONFIRMATION DATA 4 |
| CURRENT CARD | 0003 | CONFIRMATION DATA 3 |

F1: NEXT CARD    F2: TERMINATION

FIG. 12

| | 24 | 25 | 23 | 4a' |
|---|---|---|---|---|
| | A1 | 1 | ISSUE AGENT'S DATA | |
| | A2 | 0 | CARRIER'S DATA | |
| | B1 | 1 | BASIC DATA | |

} 21 ATTRIBUTION DATA GROUP

| 26 | 27 | 28 |
|---|---|---|
| 000001 | A1 | DATA 01 |
| | A2 | DATA 02 |
| | B1 | DATA 03 |

| 26 | | |
|---|---|---|
| 000002 | A1 | DATA 01 |
| | A2 | DATA 02 |
| | B1 | DATA 03 |
| | 27 | 28 |

} 22 ISSUE DATA GROUP

FIG. 14

| | | | |
|---|---|---|---|
| A1 | ISSUE AGENT'S DATA | ISSUE | NOT ISSUE |
| A2 | CARRIER'S DATA | ISSUE | NOT ISSUE |
| B1 | BASIC DATA | ISSUE | NOT ISSUE |

32(24)  31(23)  33(25)

\*\*\* ISSUE DATA SELECTION \*\*\*

SELECT ISSUE/NOT ISSUE.

Esc: INTERRUPT         F10: SELECTION COMPLETED

PORTABLE STORAGE MEDIUM ISSUING SYSTEM AND ISSUING METHOD

BACKGROUND OF THE INVENTION

1. Field of the Invention

The present invention relates to a portable storage medium issuing system and an issuing method to issue a portable storage medium such as an IC card having at last a built-in memory.

2. Description of the Related Art

In recent years a so-called IC card equipped with a built-in non-volatile data memory and a CPU (Central Processing Unit) for controlling thereof is utilized in various fields as a portable storage medium.

This kind of IC card is normally issued by card issuing agents using IC card issuing systems. It was the general procedure for issuing IC cards using a system to issue IC cards in order by writing issue data into IC cards in order of issue data registration starting from a designated card based on the issue data registered (stored) in advance in a card issuing system.

When writing issue data into IC cards (the card issuing) in an IC card issuing system, the top card and the number of cards to be issued were so far designated among a plurality of issue data stored in an IC card issuing system. IC cards were issued in order starting from this designated card up to the designated number of cards to be issued.

However, such an IC card issuing method as this is based on the assumption that all cards with issuing data written subsequent to the designated card become subjects for issue. So, if issue data for IC cards that are not to be issued become subjects for issue, such an issuing method was so far used that IC cards were issued after the issuing process was once terminated and then, IC cards to be issued were designated again. Therefore, if a plurality of issue data contained those data that were not to be issued, the work efficiency of IC card issue was extremely deteriorated.

Further, when issuing IC cards, it was also based on the assumption that all issue data stored for every IC card became the subject for issue. Therefore, there was such the problem that even when there were some issue data requiring no card issue, they might be written into IC cards. Furthermore, it might become necessary to create a new issue data file excluding unnecessary issue data and thus, the IC card issuing work efficiency was deteriorated.

SUMMARY OF THE INVENTION

It is an object of the present invention to provide a portable storage medium issuing system and a method of issuing thereof, capable of efficiently issuing portable storage media and improving the work efficiency even when issue data not to be issued are contained in a plurality of issue data prepared for in advance.

It is another object of the present invention to provide a portable storage medium issuing system and a method of issuing thereof, capable of efficiently performing the issue process of IC cards by taking out only required issue data easily.

According to the present invention, there is provided a portable storage medium issuing system to issue a portable storage medium by writing issue data in a memory built in the portable storage medium, comprising means for storing a plurality of issue data including identification data peculiar to respective issue data; means for displaying identification data of portable storage medium currently intending to issue and identification data of portable storage medium intending to issue next to portable storage medium currently intending to issue; means for designating portable storage medium intending to issue next as an object of issue if the issue of portable storage medium currently intending to issue is suspended when identification data of portable storage medium currently intending to issue and identification data of portable storage medium intending to issue next are displayed on the displaying means; first control means for changing and setting identification data of portable storage medium currently intending to issue to identification data of portable storage medium intending to issue next if portable storage medium intending to issue next is designated by the designating means, and displaying identification data of portable storage medium currently intending to issue and identification data of portable storage medium intending to issue next again on the displaying means, respectively; means for reading out issue data corresponding to identification data of portable storage medium currently intending to issue and being displayed on the display means from the storing means; means for writing the issue data read by the reading means into the memory of portable storage medium to be issued; and second control means for controlling so as to update identification data of portable storage medium currently intending to issue to identification data of portable storage medium intending to issue next when the writing operation by the writing means is completed, and repeat the issuing operations after the operation of the display means.

Further, according to the present invention, there is provided a portable storage medium issuing method to issue portable storage medium by writing issue data in a memory built in the portable storage medium, comprising the steps of storing a plurality of issue data including identification data peculiar to respective issue data in a storage means; displaying identification data of portable storage medium currently intending to issue and identification data of portable storage medium intending to issue next to the portable storage medium currently intending to issue on a display, respectively; designating portable storage medium intending to issue next as an object of issue if the issue of portable storage medium currently intending to issue is suspended when identification data of portable storage medium currently intending to issue and identification data of portable storage medium intending to issue next are displayed on the display; changing and setting identification data of portable storage medium currently intending to issue to identification data of portable storage medium intending to issue next if portable storage medium intending to issue next is designated in the designating step, and displaying identification data of portable storage medium currently intending to issue and identification data of portable storage medium intending to issue next on the display, respectively; reading out issue data corresponding to identification data of portable storage medium currently intending to issue and being displayed on the display from the storage means; writing the issue data read out in the reading step into the memory of portable storage medium to be issued; and controlling so as to update identification data of portable storage medium currently intending to issue to identification data of portable storage medium intending to issue next when the writing operation in the writing step is completed, and repeating the issuing operations after the operation of the displaying step.

Further, according to the present invention, there is provided a portable storage medium issuing system comprising a portable storage medium having a data memory and a control element; means for storing a plurality of issue data to be written into the data memory when issuing the portable storage medium; means for selecting whether each issue data is to be written into the data memory for every issue data stored in the storing means; and means for writing only issue data selected by the selecting means into the data memory of the portable storage medium to be issued.

BRIEF DESCRIPTION OF THE DRAWINGS

FIG. 4 is a front view illustrating a definite example of a menu displayed on a screen of a display of an IC card issue system;

FIG. 5 is a front view illustrating contents displayed on a screen of a display during the issue operation in the embodiment 1;

FIG. 6 is a front view illustrating contents displayed on a screen of a display following the display contents shown in FIG. 5;

FIG. 7 is a memory map schematically illustrating a configuration of an unissued card file;

FIG. 9 is a front view illustrating contents displayed on a screen of a display for selecting card numbers which is not issued;

FIG. 10 is a front view illustrating contents displayed on a screen of a display during the issue operation in the embodiment 2;

FIG. 11 is a front view illustrating contents displayed on a screen of a display following the display contents shown in FIG. 10;

FIG. 12 is a memory map schematically illustrating a configuration of an issue data file in the embodiment 3;

FIG. 14 is a front view illustrating contents displayed on a screen of a display for selecting issue data.

DETAILED DESCRIPTION OF THE PREFERRED EMBODIMENTS

Hereinafter, embodiments of the present invention will be described referring to the attached drawings.

Figure 1:
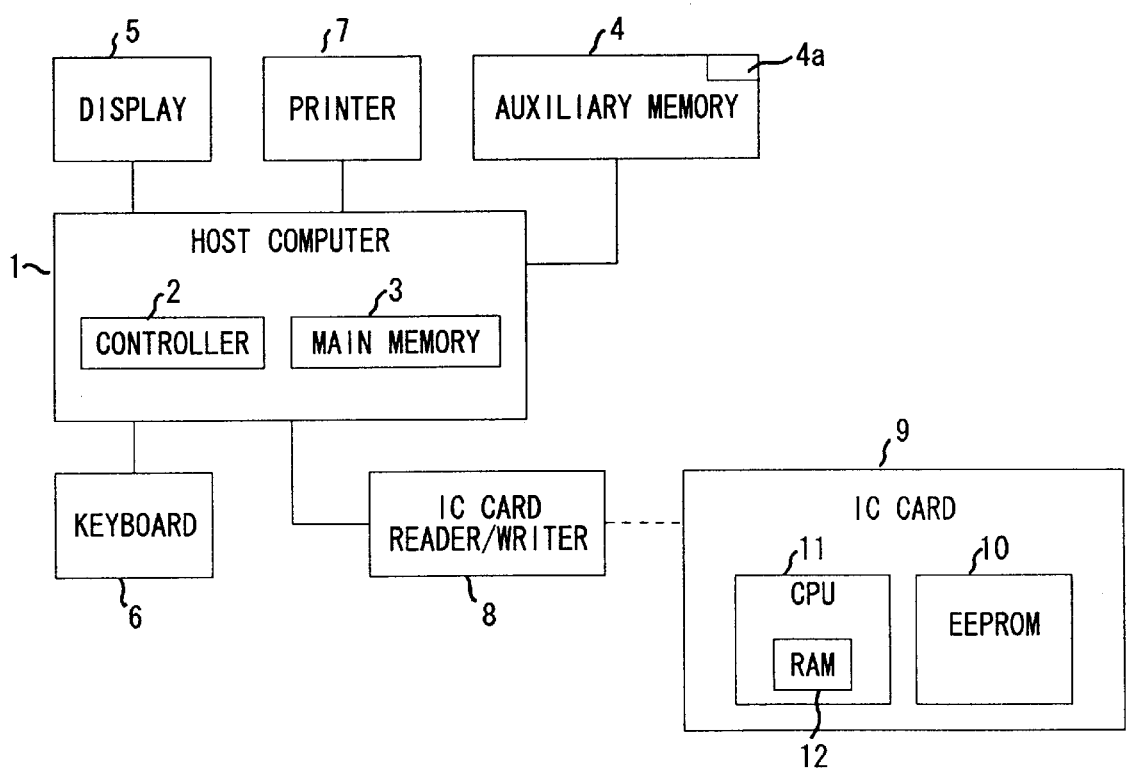
FIG. 1 is a block diagram schematically illustrating a configuration of an IC card issuing system with the present invention applied.

FIG. 1 illustrates an example of a configuration of an IC card issue system as one example of a portable storage medium of the present invention. In FIG. 1 a host computer 1 which controls the entirety of the system is equipped with a controller 2 which is composed of a CPU to control the issue system and the like and a main memory 3 which stores a control program of controller 2.

Host computer 1 is connected with an auxiliary memory 4, a display 5, a keyboard 6 and a printer 7. Auxiliary memory 4 is used as a memory storing data on persons to whom IC cards are issued, an issue data file 4 in which a plurality of issue data needed for IC card issue are stored (registered) and the like. Display 5 is used as a means to display the operating procedural menu, the operating state, and the like of this system to operator. Keyboard 6 is used as an input means to operate the system according to the guidance displayed on display 5. Printer 7 is used as a means to print and record an issue list containing issue dates of IC cards, issue data file names, card numbers, number of cards issued and the like.

Host computer 1 is connected with an IC card reader/writer 8 as a writing means. When an IC card (a portable storage medium) 9 is inserted and set, IC card reader/writer 8 writes issue data into a memory of IC card 9 and/or read prescribed data out of the memory of IC card 9 as required.

IC card 9 has a built-in IC chip having a data memory 10 composed of a non-volatile memory, for instance, EEPROM (Electrically Erasable Programmable Read Only Memory) and a CPU 11 for controlling data memory 10. A RAM 12 is provided in CPU 11 for temporarily storing data.

Figure 2:
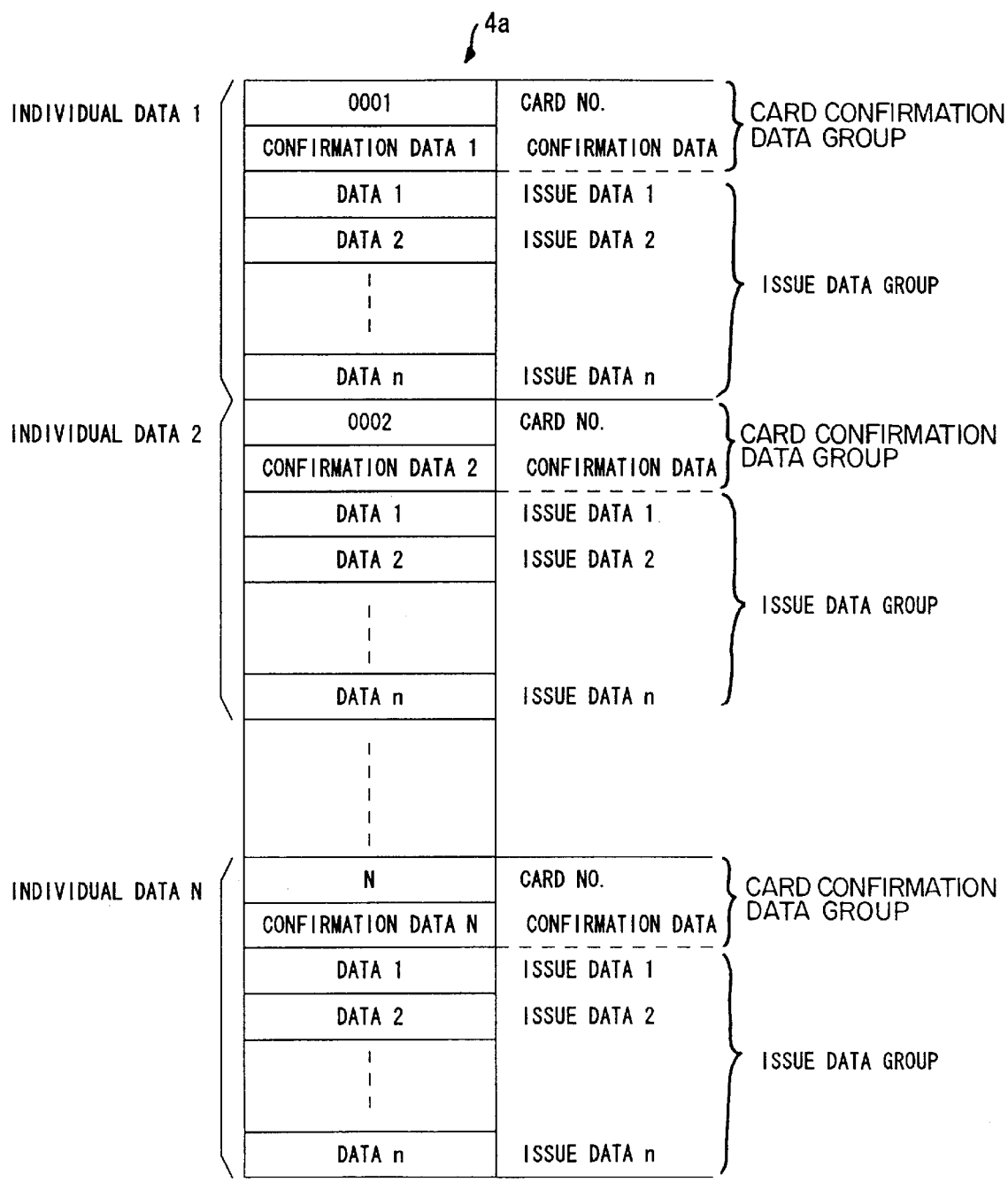
FIG. 2 is a memory map schematically illustrating a configuration of an issue data file.

Issue data file 4a stored in auxiliary memory 4 has such a format, for instance, as shown in FIG. 2. That is, issue data file 4a is composed of a card confirmation data group and an issue data group. The card confirmation data group contains, for instance, card numbers as peculiar identification data and confirmation data for confirmation cards (issue data). The issue data group contains, for instance, issue data 1 as the head, issue data 2, issue data 3, . . . issue data n, which are data to be written into IC card 9. These issue data 1, 2, 3, . . . n are, for instance, employee's number, assigned section name, date of birth, card effective term, and etc. which are recorded as data in an employee's certificate in a company.

Card number and confirmation data of the confirmation data group described above are displayed on display 5 in order to confirm the issue data recorded on an IC card when issued. The card number shows the position number occupied by the issue data of one IC card in issue data file 4a. These confirmation data are to facilitate the checking of IC card 9 by assigning a name of a person who is carrying IC card 9 and the like.

Figure 3A:
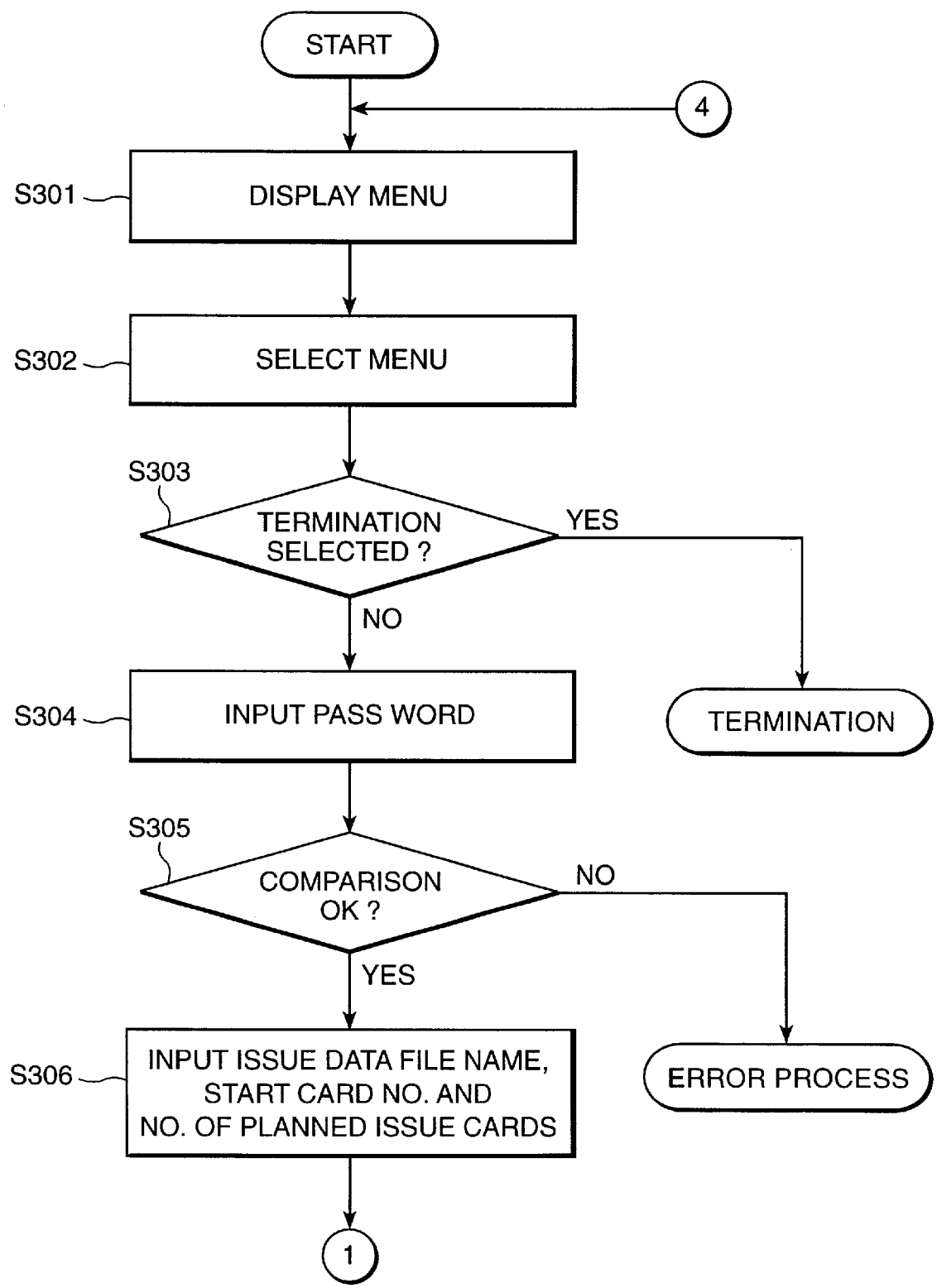
FIG. 3A through FIG. 3C are flowcharts for explaining the process operations of the embodiment 1.
Figure 3B:
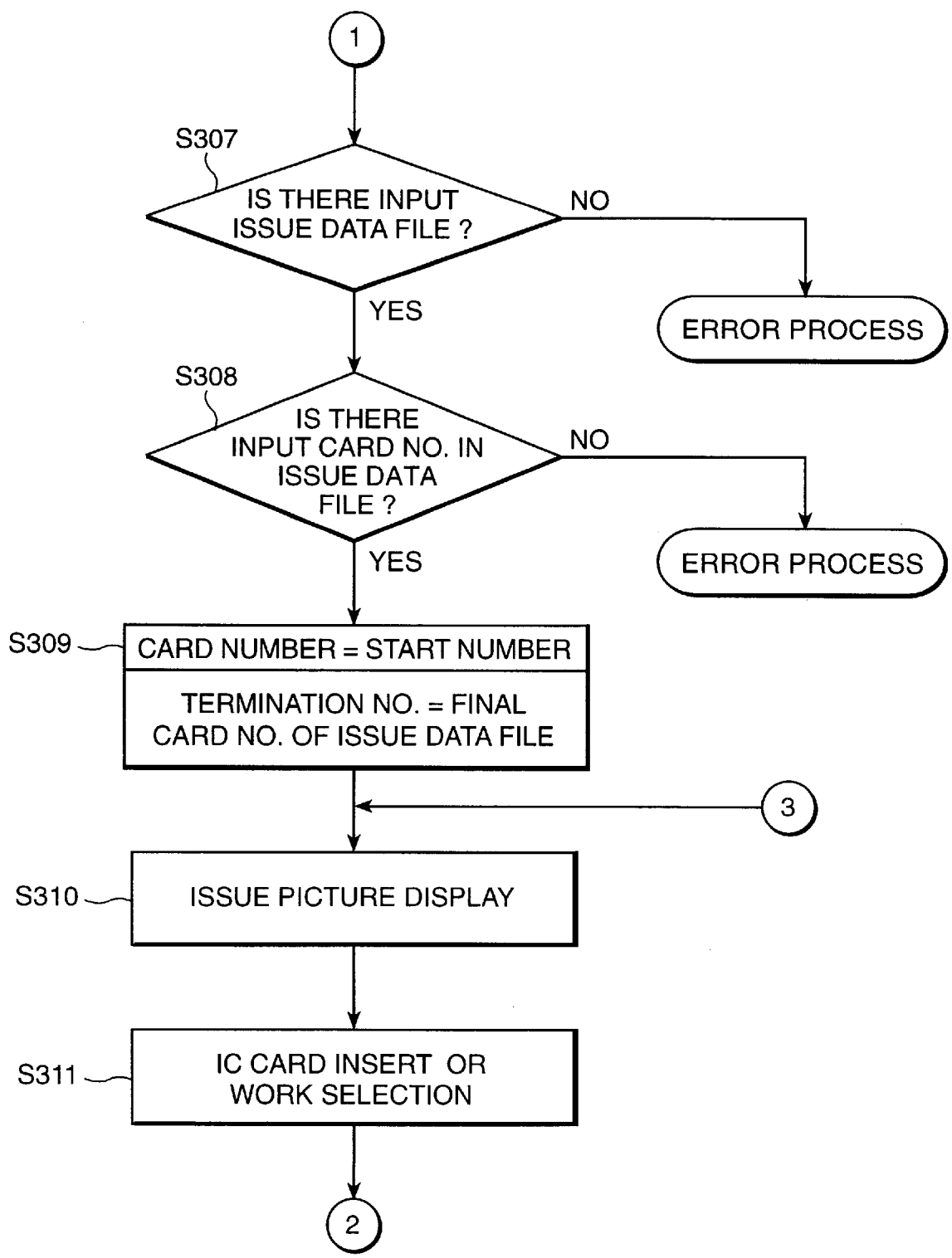
Figure 3C:
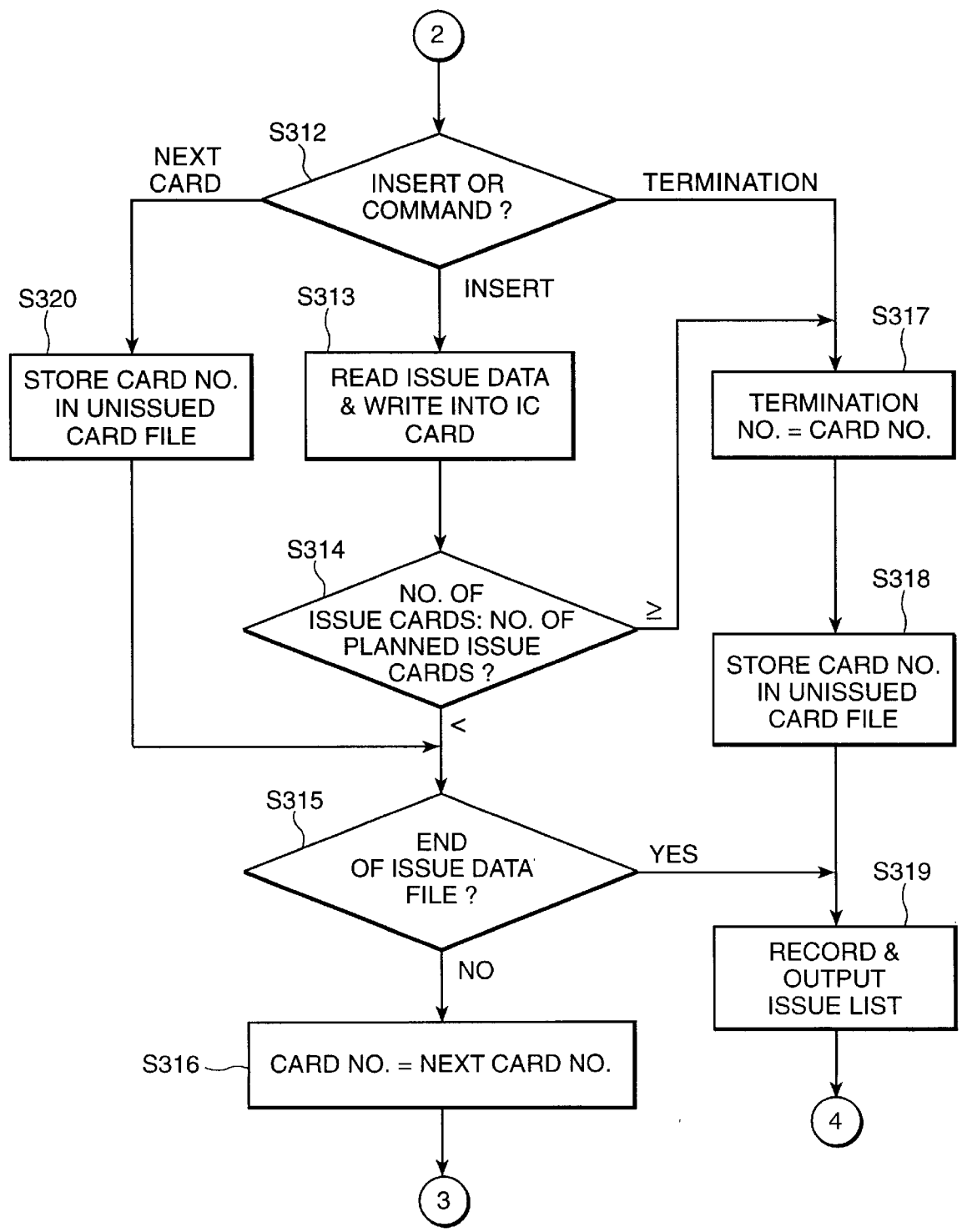

Next, the process operations involved in the first embodiment in the configuration described above will be explained referring to the flowcharts shown in FIG. 3A through FIG. 3C. First, when this system is started, for instance, such a menu picture as shown in Fell. 4 is displayed on display 5 (S301). Here, if operator selects one item from the menu displayed on display 5 (S302), a series of processes corresponding to the selected item will start.

For instance, if "3. CARD ISSUE" is selected (S303), host computer 1 starts the card issue process. When the card issue process is started, a message requesting the input of a password is displayed on display 5. When operator inputs a password through keyboard 6 (S304), host computer 1 compares this input password with a password that was pre-stored in auxiliary memory 4 (S305). If both passwords agreed with each other, host computer 1 displays a message on display 5, requesting input of, for instance, a name of a data file to be issued, a starting card number and number of cards planned to issue (planned issue quantity).

Here, if operator inputs these data through keyboard 6, the input data are stored in main memory 3 in host computer 1 (S306).

Then, confirming that issue data file 4a corresponding to the input issue data file name is stored in auxiliary memory 4 (S307), host computer 1 confirms that card numbers from the input card number to the last card number for the number of cards to be issued exist in issue data file 4a described above (S308).

In this confirmation, if there is no issue data file 4a corresponding to the input issue data file name in auxiliary memory 4 (S307) or if card numbers covering the input card number through the last card number of the number of cards to be issued do not exist in issue data file 4a described above (S308), host computer 1 proceeds to the error process and carries out the prescribed process.

In the above confirmation, if there exist card numbers covering the input card number through the last card number of cards to be issued (S308), host computer 1 makes the input card number as the starting number. At the same time, the final card number of issue data file 4a is made as the last card number (S309). Then, host computer 1 displays a message on display 5, requesting input of IC card 9 into IC card reader/writer 8 and also, displays data included in the card confirmation data group of IC card to be issued. This display picture is called as an issue picture and the confirmation data group of IC cards currently intending to issue and the card confirmation data group of IC cards intending to be issued next to the IC cards currently intending to issued is displayed on this issue picture (S310).

Further, the phrase "F1: NEXT CARDS" is displayed for issuing next IC cards without issuing IC cards currently intending to issue. At the same time, "F2: TERMINATION" is displayed for terminating the issue process without issuing IC cards subsequent to those IC cards being displayed. An example of an IC card issue picture on which 3 types of issue are selectable; issue current IC cards, select issue of next IC cards without issuing current IC cards and terminate issue of IC cards without issuing IC cards after current IC cards is shown in FIG. 5.

In the picture shown in FIG. 5, operator inputs an issue start command. That is, in this example, if IC card 9 to be issued is inserted into IC card reader/writer 8 (S311 and S312), an issue start command is input automatically. When the issue start command is input, host computer 1 reads an issue data group (Issue Data 1 through n) assigned with a card number of IC card ("0001" in the example shown in FIG. 5) that is in accord with IC card being displayed on display 5 intending for issue currently out of issue data file 4a in auxiliary memory 4. This readout issue data group is sent to CPU 11 of IC card 9 via IC card reader/writer 8 and written into data memory 10 by CPU 11 (S313).

When the write process to a single sheet of IC card 9 is completed, host computer 1 compares the number of currently issuing cards with the previously input number of cards planned for issue (S314) and if the number of currently issuing cards does not reach the number of cards planned for issue, checks whether the current issue data are the last issue data of issue data file 4a (S315). If the current issue data are not the last issue data, host computer 1 changes the current card number to the next card number by increasing the number by one (S316) and returns to Step 310 to display the issue picture again.

As this time, as an issue picture that is displayed again on display 5, for instance, the issue picture shown in FIG. 6 is displayed. In the issue picture shown in FIG. 6, the card confirmation data group that was displayed as the next card in the issue picture in FIG. 5 is moved to the current card. Further, for the next card confirmation data group, the card next to that displayed on issue data file 4a as the current card is displayed.

Thereafter, the issue operation is carried out in the similarly manner and the card issue process is repeatedly carried out until IC card 9 in the planned number of sheets input is issued. When the issue of cards in the intending number of sheets is completed (S314), host computer 1 makes the card number at this time as the termination number (S317). The card number corresponding to the termination number is stored in, for instance, an unissued card file provided in auxiliary memory 4 as shown in FIG. 7 (S318).

Then, host computer 1 prints, records and outputs an issue list of issued IC card 9 (enumerating, for instance, date of issue, issue data file name, card numbers, number of cards issued and the like) by driving printer 7 and returns to the menu picture in Step S301. Further, the printing and recording of the issue list is performed for issue data for the card which is not stored in the unissued card file out of the issue data from the top number to the termination number of issue data file 4a.

Further, when the issue data up to that at the end of issue data file 4a were issued (S315), host computer 1 prints, records and outputs the issue list of issued IC card 9 (S319) and returns to the menu picture in Step S301.

By the way, for instance, if the current cards are not issued, when the issue picture shown in FIG. 5 is being displayed (S310), "NEXT CARD" is selected and designated without inserting IC card 9 into IC card reader/writer (S311 and S312). When "NEXT CARD" is designated, the current card of which issue was suspended is stored in the unissued card file (S320) and it is checked whether the current card number (the issue data) is the termination card number (the issue data) of issue data file 4a (S315). If it is not the termination card number, host computer 1 sets the current card number for the next card number (S316) and returns to Step S310 to display the issue picture again. In this case, the issue picture that is displayed again will be as shown in FIG. 6.

If the current card is not issued in the issue process as described above, it is possible not to issue any IC card only by selecting the next card without issuing the current card and thus, IC card that is a subject of issue can be issued efficiently without interrupting the process.

Figure 8A:
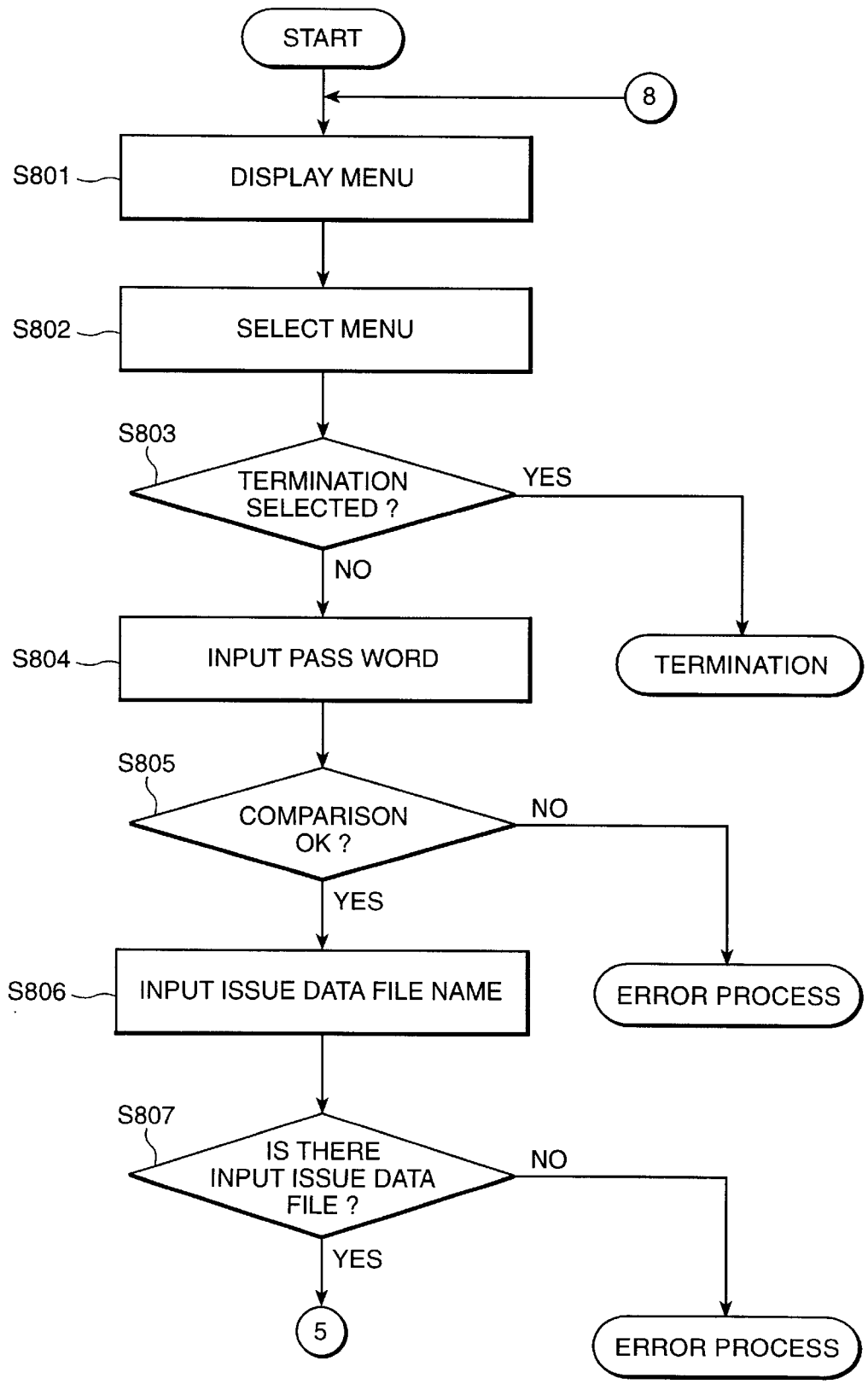
FIG. 8A through FIG. 8C are flowcharts for explaining process operations of the embodiment 2.
Figure 8B:
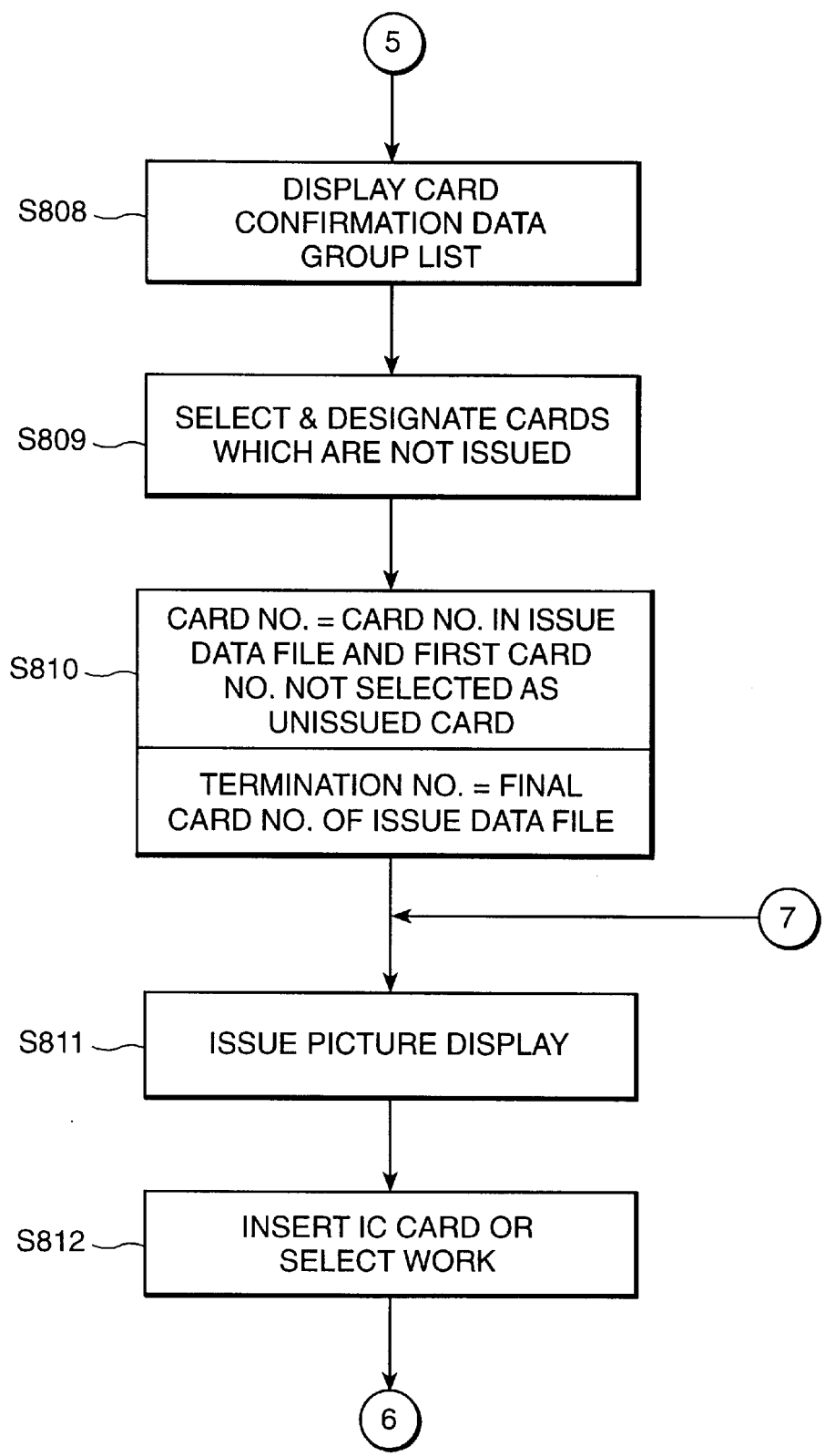
Figure 8C:
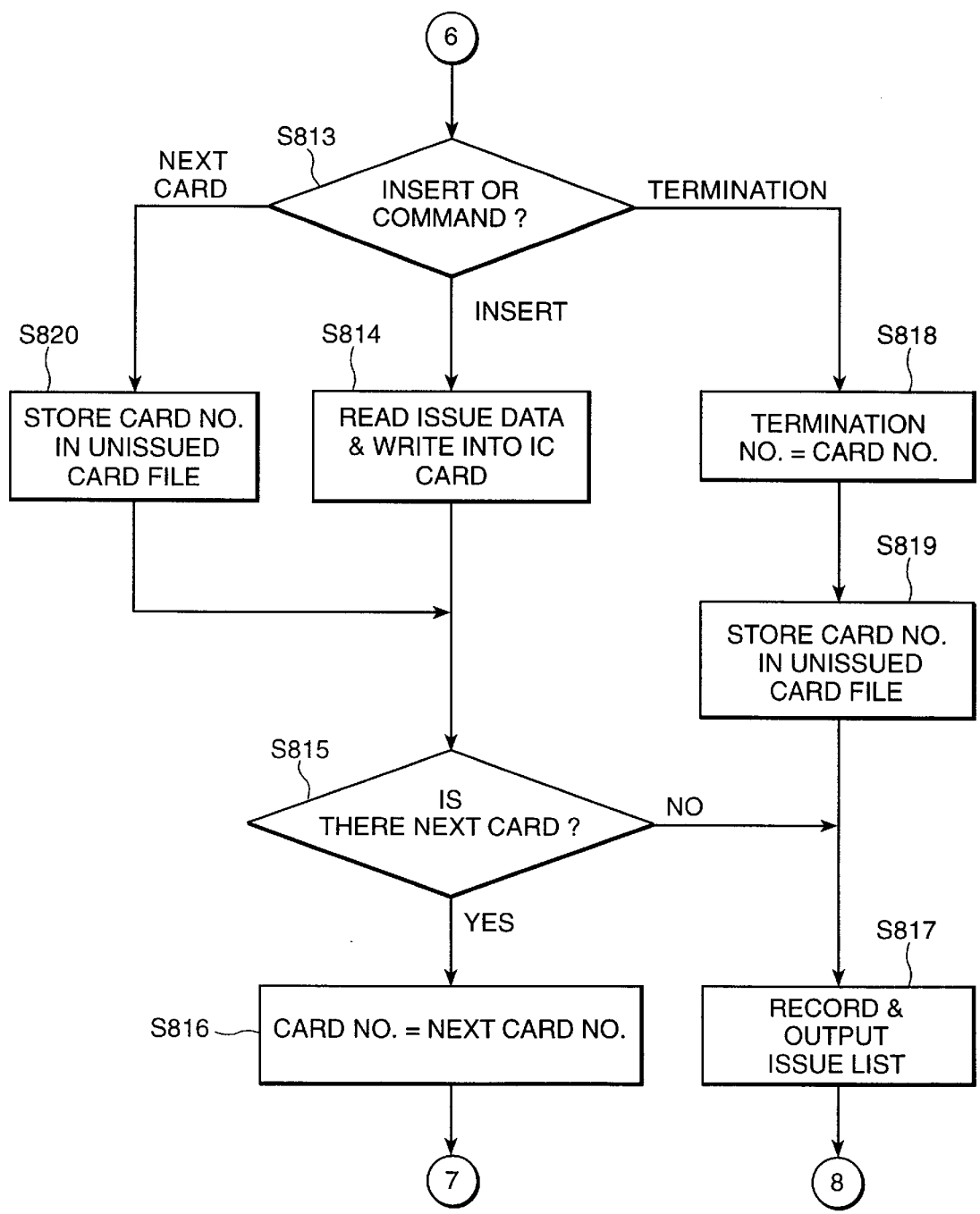

Next, the process operation involved in the second embodiment will be described referring to the flowcharts shown in FIG. 8A through FIG. 8C. The configurations conforming to the IC card issuing system shown in FIG. 1 and the issue data file shown in FIG. 2 are used to describe the second embodiment.

First, when this system is started, a menu picture as shown in FIG. 4 is displayed on display 5 (S801). Here, when operator selects one item from the menu displayed on display 5 (S802), a series of processes corresponding to the selected item are started.

When, for instance, "3. CARD ISSUE" is selected (S803), host computer 1 starts the card issue process. When the card issue process is started, a message requesting the input of a password is displayed on display 5. Here, if operator inputs a password through keyboard 6 (S804), host computer 1 compares this input password with the password pre-stored in auxiliary memory 4 (S805). When both pass words agree with each other, a message requesting the input of an issue data file name to be issued is displayed on display 5. Here, when operator inputs an issue data file name through keyboard 6, the input data is stored in main memory 3 in host computer 1 (S806).

Then, host computer 1 confirms that issue data file 4a corresponding to the input issue data file name is stored in auxiliary memory 4 (S807) and if not, proceeds to the error process and carries out the prescribed process.

When issue data file 4a corresponding to the input issue data file name is stored in issue data file 4a, host computer 1 displays messages requesting a list of card confirmation data group in issue data file 4a and the designation of card numbers of cards that are not issued, respectively on display 5 (S808). Here, when the card number of a card that is not issued is designated and input through keyboard 6 (S809), the designated card number is stored in the unissued card file shown in FIG. 7.

In this case, as a method to designate a card number of a card that is not issued, for instance, display such a registration picture of card numbers for cards that are not issued as shown in FIG. 9 on display 5. I do card confirmation information group in a list by 1 stroke respect unit successively, and it is indicated by indication device. A list of all card confirmation data groups stored in issue data file 4a are displayed on this picture by one screen unit successively. The operator moves the cursor to the position of a card number of a card that is not issued. When a specific key of the keyboard is pushed at the position to where the cursor is moved, that card number is stored in the unissued card file. Simultaneously with this storage, that card number is reversed in the picture so that the selection is readily discriminated at a glance.

In the example shown in FIG. 9, when the F1 key that is simultaneously displayed is pushed, the next card confirmation data group is displayed. Pushing the F2 key displays the preceding card confirmation data group. Pushing the F3 key designates not to issue that card. Pushing the F4 key terminates this picture. Further, the cursor is indicated by the underline and moves in the direction to which the arrow key in keyboard 6 is pushed. In this example of picture, the card numbers "0002" and "0005" are in the designated state not to be issued and the cursor is at the position of the card number "0003".

When completing the designation of card numbers of cards that are not to be issued, host computer 1 sets the first card number that was not selected as a card not to be issued in the card numbers of issue data file 4a as an issue card number. At the same time, designating the last card number of issue data file 4a as the termination number (S810), host computer 1 displays a message on display 5, requesting insertion of IC card 9 into IC card reader/writer 8 and also, displays data contained in card confirmation data group of IC cards to be issued. This display picture is called as an issue picture and card confirmation data group of IC cards currently to be issued and card confirmation data group of IC cards that are intended to be issued next to the currently issuing IC cards are displayed on this issue picture (S811).

Further, for issuing the next IC card without issuing IC card currently intending to issue, the phrase of "F1: NEXT CARD" is displayed. At the same time, for terminating the issue process without issuing cards subsequent to the IC card being displayed, the phrase "F2: TERMINATION" is displayed. Thus, an example of an IC card issue picture that is selectable 3 types of issue; issue current IC cards, select issue of next IC cards without issuing current IC cards and terminate issue of IC cards without issuing IC cards after current IC cards are shown in FIG. 10.

However, "NEXT CARD" displayed here indicates a card number behind the current card number, stored in the unissued card file and most close to the current card number. Shown in FIG. 10 is an example wherein card numbers in issue data file 4a continue like "001", "002", ... as shown in FIG. 2 and an unissued card file contains card number "0002" as shown in FIG. 7. Because of this, the current card number is "0001" and the next card number will become "0003".

In the picture shown in FIG. 10, operator inputs an issue start command. That is, in this example, the issue start command is automatically input when IC card 9 to be issued is inserted into IC card reader/writer 8 (S812 and S813). When the issue start command is input, host computer 1 reads an issue data group (Issue Data 1-n) assigned with a card number that is in accord with the card number of IC card that is currently displayed on display 5 for issue ("0001" in the example in FIG. 10) out of issue data file 4a in auxiliary memory 4. This readout issue data group is sent to CPU 11 of IC card 9 via IC card reader/writer 8 and written into data memory 10 by CPU 11 (S814).

When the write process to a single sheet of IC card 9 is completed, host computer 1 checks whether there exists the next issue card (S815). When this check reveals there is the next issue card, the current card number for the next card number ("0003" in this case) (S816) is set and the operation returns to Step 811 to display the issue picture again.

At this time, for instance, the issue picture shown in FIG. 11 is displayed as the issue picture that is displayed again on display 5 and the current and next card numbers will become "0003" and "0004", respectively.

Thereafter, the card issue process is repeated in the same manner until the next card to be issued no longer exists. When a card to be issued no longer exists (S815), host computer 1 drives printer 7 to print, record and output a list of issued IC card 9 (e.g., date of issue, issue data file name, card number, number of cards issued and the like) (S817) and returns to the menu picture in Step 801. Further, the printing and recording of an issue list are carried out for issue data of cards that are not stored in the unissued card file out of issue data of card numbers ranging from the top to the termination numbers contained in issue data file 4a.

Further, for instance, if the termination is selected in the issue picture shown in FIG. 10 and FIG. 11 (S812 and S813), host computer 1 terminates the card issue process and makes a card number at this time as a termination number (S818), stores a card number corresponding to this termination number in the unissued card file as shown in FIG. 7 (S819), and prints, records and outputs an issue list of issued IC card 9 (S817) and returns to the menu picture in Step S801.

By the way, for instance, if the current card is not issued when the issue picture shown in FIG. 10 is being displayed (S811), "NEXT CARD" is selected and designated (S812 and S813) without inserting IC card 9 into IC card reader/writer 8. When "NEXT CARD" is designated, host computer 1 stores the current card number of IC card which is suspended to issue in the unissued card file (S820) and checks whether there exists the next issue card (S815). If this check reveals that there is no next issue card, host computer 1 prints, records and output an issue list of issued IC card 9 (S817) and returns to the menu picture in Step S801. If there is a next issue card, host computer 1 sets the current card number for the next card number ("0003" in this case) (S816) and returns to Step S811 to display the issue picture again.

Thus, in the stage before shifting to the issue picture, a list of pre-registered (stored) card numbers is displayed together with confirmation data. By selecting and designating a card number of a card that is not issued from this issued list and without displaying it on the issue picture, it is possible not to issue optional IC card only. Accordingly, IC card that is a subject for issue can be issued efficiently without interrupting the process.

Next, the third embodiment to perform the IC card issue process by taking out required issue data only will be described. The IC card issuing system of the third embodiment is configured to same as the IC card issuing system shown in FIG. 1.

FIG. 12 shows a format of an issue data file 4a' that is stored in auxiliary memory 4. Issue data file 4a' is composed of an issue data attribution data group 21 comprising an issue data item name 23, a data ID 24, an issue requirement section 25, etc. and an issue data group 22 comprising a card number 26, a data ID 27, an issue data 28, etc.

If issue of this issue data (write into IC card) is required, "1" is set in issue requirement section 25 of attribution data group 21 and "0" is set if the issue is not required.

Issue data group 22 stores issue data for one person (a single IC card) comprising a 6-byte card number 26 at a top, plural data IDs 27 and issue data 28, that is, such data named as "Data 01", "Data 02", . . . , as shown in FIG. 12 as one example. Further, a plurality of issue data for one person are collected to compose the entire issue data group 22.

Figure 13A:
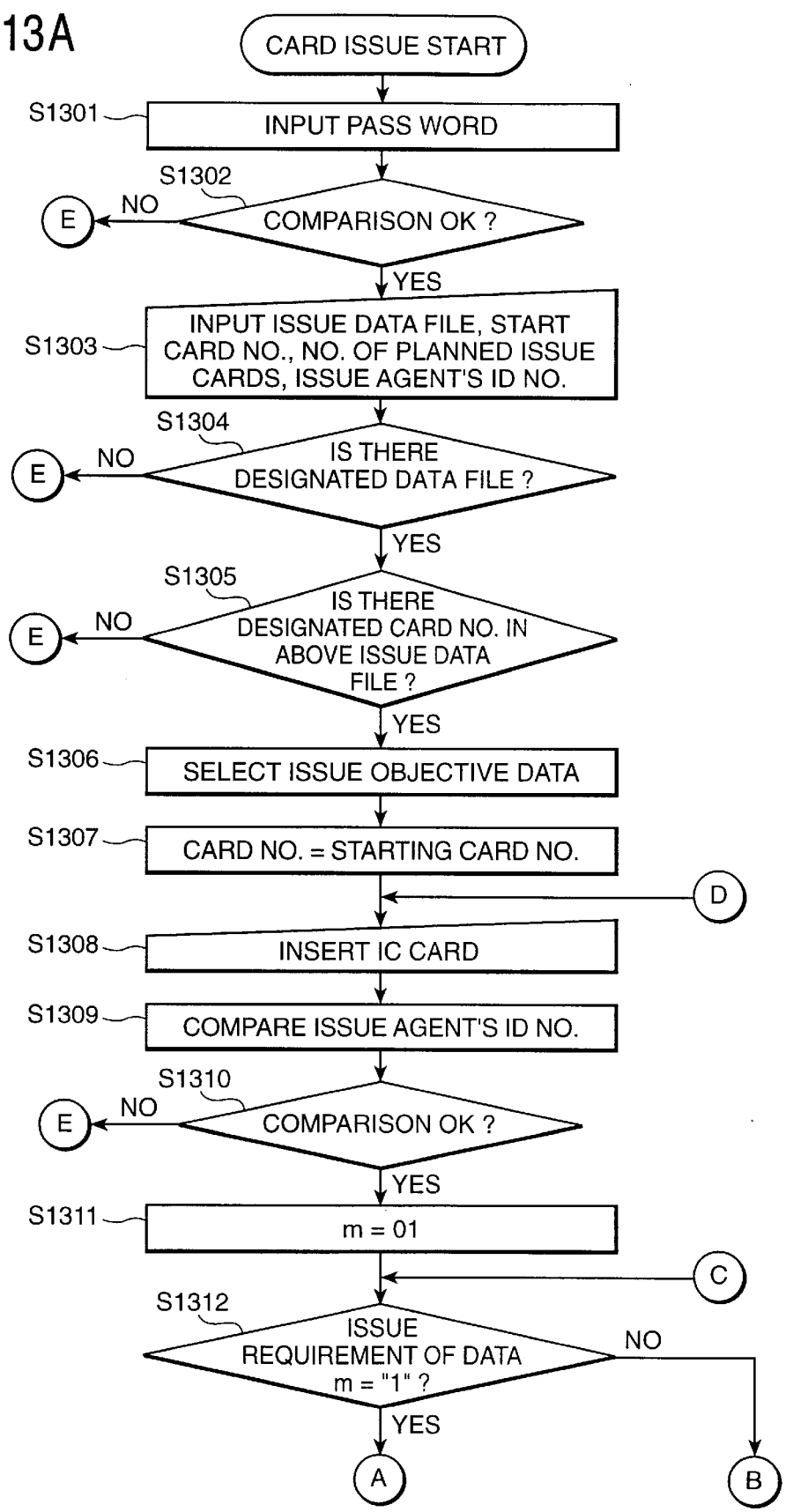
FIG. 13A and FIG. 13B are flowcharts for explaining process operations of the embodiment 3.
Figure 13B:
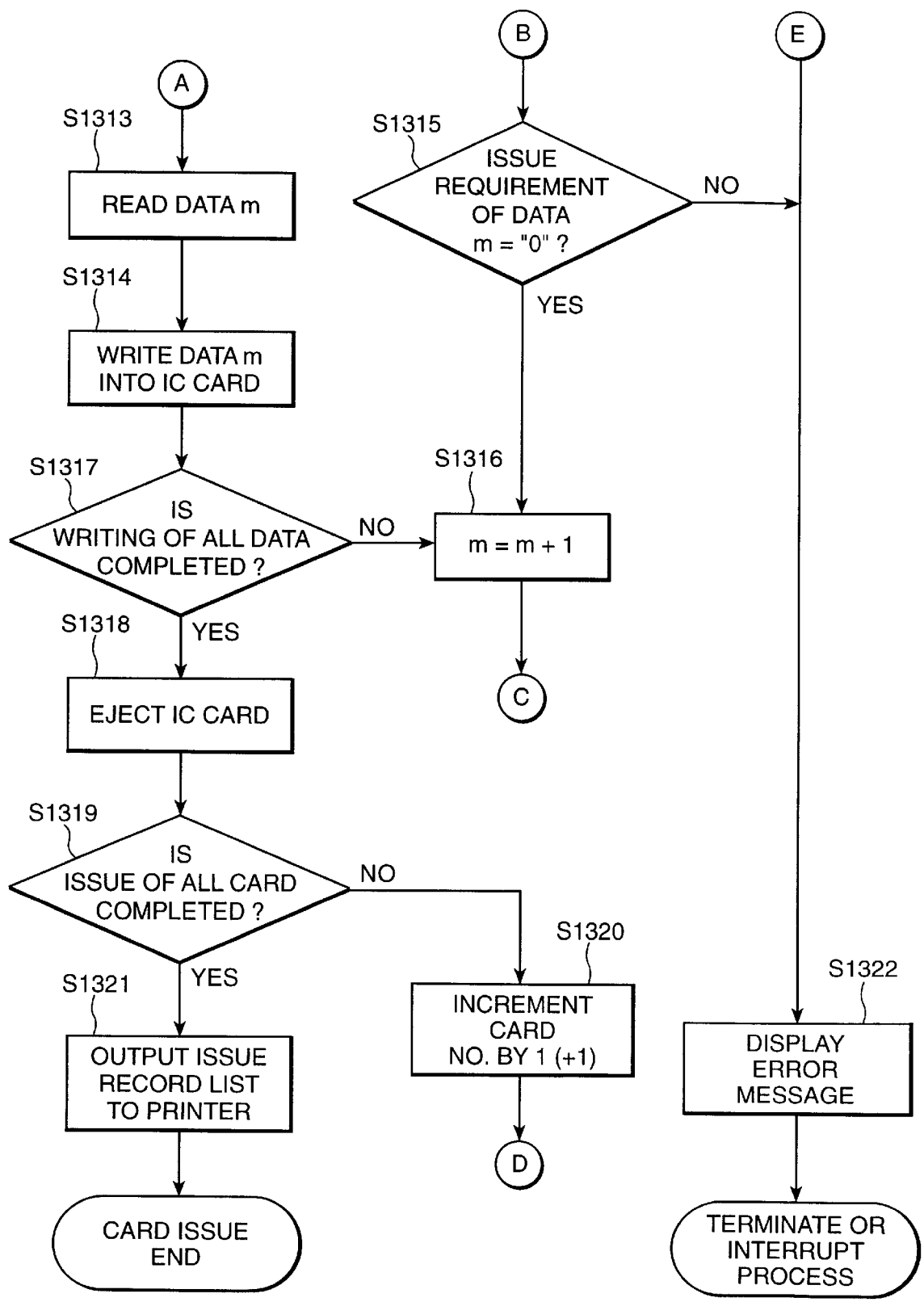

Next, the IC card issue operation in such the configuration as described above will be described referring to the flowcharts shown in FIG. 13A and FIG. 13B.

First, when this system is started, such a menu picture as shown in FIG. 4 is displayed on display 5. When operator selects one item from this picture, a series of processes corresponding to the selected item is started.

When "3. CARD ISSUE" is selected here, the card issue process starts and a message requesting input of a pass word is displayed on display 5.

When operator inputs a password through keyboard 6 (S1301), host computer 1 compares this input password with a password pre-stored in auxiliary memory 4 (S1302). If both passwords agree with each other, a message is displayed on display 5, requesting input of a data file name to be issued, a start card number and planned number of cards to be issued.

A data file name to be issued, start card number and planned number of cards to be issued are input by operator according to the instruction displayed on display 5 (S1303). These input data are stored in main memory 3 in host computer 1.

Host computer 1 checks that designated issue data file 4a' is stored in auxiliary memory 4 (S1304). When this check reveals there is issue data file 4a', host computer 1 stores issue data file 4a' in main memory 3 and checks if there are card numbers from the input card number to the last card number covering planned number of cards to be issued in that issue data file 4a' (S1305).

If that data file exists, host computer 1 displays a list of issue data contained in designated issue data file 4a' on display 5 as shown in FIG. 14 and requests selection of issue data that become the subject of issue (or selection of issue data that do not become the subject of issue) by a message. The contents of attribution data group 11 of the issue data stored in auxiliary memory 4 and shown in FIG. 12 are displayed on display 5.

That is, attribution data such as issue data item names 31, data IDs, etc. and an issue requirement column (issue/not issue) 33 showing whether data are currently objects of issue are displayed. Either one of "Issue" and "Not Issue" is reversed and displayed in issue requirement column 33. Operator selects the requirement for each issue data by moving the reversed cursor by the arrow key (S1306). In FIG. 14, it means that the reversed display was selected (the hatched portion).

When the F10 key (Selection Completed) is pushed in the picture shown in FIG. 14, the issue requirement is written into issue requirement section 25 of issue data file 4a' shown in FIG. 12. That is, if "Issue" is selected on display 5, "1" is set in issue requirement section 25 corresponding to each issue data of the file and if "Not Issue" is selected, "0" is set.

When the selection of issue objective data is completed, "Start Card No" is displayed in the issue objective card column, "0" in the number of issue cards column and a message requesting the insertion of IC card is displayed.

When operator inserts IC card 9 into IC card reader/writer 8 in response to this request (S1308), an issuing agent's ID number that was input through keyboard 6 and stored in main memory 3 of host computer 1 is sent to IC card 9 via IC card reader/writer 8. This issuing agent's ID number is compared with an issuing agent's ID number pre-stored in data memory 10 in IC card 9 (S1309) to confirm both are the same (S1310).

When both ID numbers are confirmed to be the same, host computer 1 sends only issue data which are set as "1" in corresponding issue requirement section 25 in attribution data group 21 out of all issue data 28 (e.g., issue data m for one person ("Data 01" through "Data m")) belonged to start card number 26 (e.g., "000001") stored in issue data file 4a' to IC card 9 via IC card reader/writer 8 and writes into data memory 10 of IC card 9.

That is, a value of issue requirement section 25 of issue data attribution data group 21 having the same data ID as "Data 01" is checked (S1312). When this value is "1", "Data 1" is sent to IC card 9 and written into data memory 10 of IC card 9 (S1313 and S1314) and but not written when it is "0" (S1315).

After completing the write of issue data belong to start card number 26 by repeating the same process up to "Data m" (S1317), IC card 9 is ejected from IC card reader/writer 8 (S1318). A message requesting the insertion of IC card 9 of the next card number 26 (e.g., "000002") is displayed on display 5 (S1320).

Thereafter, when the writing of data for planned number of issue cards is completed (S1319), an issue record containing date of issue, issue data file names, issued data card numbers and number of issued cards, etc. is output from printer 7 (S1321).

Further, if any error is generated during the above card issue process ("E1" in FIG. 13A and FIG. 13B), an error message is displayed on display 5 (S1322) and the process is terminated or interrupted.

According to the embodiment 3 as described above, it is possible to issue IC cards by taking only issue data required for the issue process easily out of the issue data group stored in the memory in the IC card issue system and therefore, the IC card issue process can be efficiently carried out.

According to the present invention as described above in detail, if there are issue data which are not to be issued for portable storage medium in a plurality of issue data provided for in advance, portable storage medium can be issued efficiently. Accordingly, it is possible to provide a portable storage medium issuing system and an issuing method which are capable of improving the work efficiency.

Further, according to the present invention, it is also possible to provide a portable storage medium issuing system and an issuing method that are capable of performing the issue process efficiently by taking out only required issue data easily.

What is claimed is:

1. A system for issuing portable storage media by writing issue data in respective memories of the portable storage media, the system comprising:

means for storing a plurality of issue data including identification data peculiar to respective issue data;

means for displaying identification data of a current portable storage medium currently to be issued and identification data of a next portable storage medium to be after the current portable storage medium;

means for designating the next portable storage medium to be issued as an object of issue if the issue of the current portable storage medium to be issued is suspended when identification data of the current portable storage medium and identification data of the next portable storage medium are displayed on the displaying means;

first control means for changing and setting identification data of the current portable storage medium to be issued to identification data of the next portable storage medium to be issued if the next portable storage medium to be issued is designated by the designating means, and displaying identification data of the current portable storage medium to be issued and identification data of the next portable storage medium to be issued again on the displaying means, respectively;

means for reading out issue data corresponding to identification data of the current portable storage medium to be issued and being displayed on the display means from the storing means;

means for writing the issue data read by the reading means into the memory of a portable storage medium to be issued; and second control means for controlling so as to update identification data of the current portable storage medium to be issued to identification data of the next portable storage medium to be issued when the writing operation by the writing means is completed, and for repeating the issuing operations after the operation of the display means.

2. An issuing system as claimed in claim 1, further comprising means for recording an issue list containing identification data of issued portable storage media and issued quantity of portable storage media when the repetitive operations of the second control means are completed.

3. An issuing system as claimed in claim 1, wherein the storing means stores confirmation data for confirming issue data in addition to the identification data, and the displaying means displays the confirmation data in correspondence with the identification data, respectively.

4. An issuing system as claimed in claim 1, further comprising:

first input means for inputting identification data representing a start of issue of portable storage media and a planned issue quantity of portable storage media when issuing a plurality of portable storage media; and second input means for inputting an issue start command when identification data of the current portable storage medium to be issued and identification data of the next portable storage medium to be issued arc displayed on the displaying means.

5. An issuing system as claimed in claim 4, wherein the second control means controls so as to repeat the issuing operations after the operation of the display means up to the planned issue quantity input by the first input means.

6. An issuing system as claimed in claim 4, wherein the reading means starts to read out the issue data from the storing means when the issue start command is inputted by the second input means.

7. A portable storage medium issuing method to issue portable storage medium by writing issue data in a memory built in the portable storage medium, comprising the steps of:

storing a plurality of issue data including identification data peculiar to respective issue data in a storage means;

displaying identification data of portable storage medium currently intending to issue and identification data of portable storage medium intending to issue next to the portable storage medium currently intending to issue on a display, respectively;

designating portable storage medium intending to issue next as an object of issue if the issue of portable storage medium currently intending to issue is suspended when identification data of portable storage medium currently intending to issue and identification data of portable storage medium intending to issue next are displayed on the display;

changing and setting identification data of portable storage medium currently intending to issue to identification data of portable storage medium intending to issue next if portable storage medium intending to issue next is designated in the designating step, and displaying identification data of portable storage medium currently intending to issue and identification data of portable storage medium intending to issue next on the display, respectively;

reading out issue data corresponding to identification data of portable storage medium currently intending to issue and being displayed on the display from the storage means;

writing the issue data read out in the reading step into the memory of portable storage medium to be issued; and controlling so as to update identification data of portable storage medium currently intending to issue to identification data of portable storage medium intending to issue next when the writing operation in the writing step is completed, and repeating the issuing operations after the operation of the displaying step.

8. An issuing method as claimed in claim 7, further comprising recording an issue list containing identification data of issued portable storage media and an issued quantity of portable storage media when the repetitive controlling is completed.

9. An issuing method as claimed in claim 7, wherein the storing stores confirmation data for confirming issue data in addition to the identification data, and the displaying displays the confirmation data in correspondence with the identification data, respectively.

10. An issuing method as claimed in claim 7, further comprising:

inputting identification data representing a start of issue of portable storage medium and a planned issue quantity of portable storage media when issuing a plurality of portable storage media; and inputting an issue start command when identification data of the current portable storage medium to be issued and identification data of the next portable storage medium to be issued are displayed on the displaying means.

11. An issuing method as claimed in claim 10, wherein the controlling controls so as to repeat the issuing operations after the the displaying up to the planned issue quantity input.

12. A portable storage medium issuing system to issue portable storage medium by writing issue data into a memory built in the portable storage medium, the system comprising:

means for storing a plurality of issue data including identification data peculiar to respective issue data;

means for displaying identification data added to a plurality of issue data stored in the storing means, respectively when issuing a plurality of portable storage media;

means for designating identification data of a portable storage medium that is not issued out of a plurality of identification data displayed by the displaying means;

means for reading out issue data corresponding to a plurality of identification data not designated by the designating means in order of storage; and means for writing issue data read by the reading means into each memory of a plurality of portable storage media to be issued in order.

13. A portable storage medium issuing system as claimed in claim 12, the issuing system further comprising means for recording an issue list containing identification data of issued portable storage media and issued quantity of portable storage media when the writing operation to a plurality of portable storage media by the writing means is completed.

14. A portable storage medium issuing system as claimed in claim 12, wherein the storing means stores confirmation data for confirming issue data in addition to the identification data, and the displaying means displays the confirmation data in correspondence with the identification data, respectively.

15. A method of issuing portable storage media by writing issue data in respective memories of the portable storage media, the method comprising:

storing a plurality of issue data including identification data peculiar to respective issue data in a storage means;

displaying respective identification data added to a plurality of the stored issue data in the storage means when issuing a plurality of portable storage media;

designating identification data of a portable storage medium which is not issued from a plurality of the displayed identification data;

reading out issue data corresponding a plurality of identification data not designated in order; and writing the readout issue data in memories of a plurality of portable storage media that are to be issued.

16. A portable storage medium issuing method as claimed in claim 15, further comprising recording an issue list containing identification data of issue portable storage media and issued quantity of portable storage media when the writing operation of a plurality of portable storage media is completed.

17. A portable storage medium issuing system to issue portable storage medium by writing issue data in a memory built in the portable storage medium, the system comprising:

means for storing a plurality of issue data including identification data peculiar to respective issue data;

first display means for displaying identification data added to a plurality of issue data stored in the storing means, respectively when issuing a plurality of portable storage media;

first designating means for designating identification data of a portable storage medium that is not issued from a plurality of identification data displayed by the first display means;

second display means for displaying identification data of a current portable storage medium to be issued and identification data of a next portable storage medium to be issued after the current portable storage medium, respectively, regarding the first identification data not designated as identification data of portable storage medium which is not issued as identification data for start of issue among the identification data stored in the storing means when the designation of identification data of portable storage medium which is not intended to issue is completed by the first designating means;

second designating means for designating a next portable storage medium to be issued as an object of issue if suspending the issue of the current portable storage medium when identification data of the current portable storage medium to be issued and identification data of the next portable storage medium to be issued are displayed by the second display means;

first control means for changing and setting identification data of the current portable storage medium to be issued to identification data of the next portable storage medium to be issued and for displaying identification data of the current portable storage medium to be issued and identification data of the next portable storage medium to be issued on the second display means, respectively, when the next portable storage medium to be issued is designated by the second designating means;

means for inputting an issue start command when identification data of the current potable storage medium to be issued and identification data of the next portable storage medium to be issued are displayed on the second display means;

means for reading out issue data corresponding to identification data of the current portable storage medium to be issued and being displayed on the second display means when the issue start command is input by the inputting means;

means for writing the issue data read by the reading means into the memory of a portable storage medium to be issued;

second control means for controlling so as to update identification data of the current portable storage medium to be issued to identification data of the next portable storage medium to be issued and for repeating the operations after the second display means until identification data of the next portable storage medium to be issued is no longer present when the writing operation by the writing means is completed; and means for recording an issue list containing identification data and a quantity of issued portable storage media when the repetitive operation by the second control means is completed.

18. A portable storage medium issuing system to issue a portable storage medium to each individual by writing issue data of each individual in a data memory of a portable storage medium having the data memory and a control element, comprising:

means for storing an issue data file containing an issue data group of each individual and attribution data including data indicating whether each of these issue data is an object of issue;

first reading means for reading out an issue data file stored in the storing means;

means for selecting if issue data in the issue data file read out by the first reading means are to be made as objects of issue;

means for changing attribution data of the issue data file stored in the storing means according to the result of selection of the selecting means;

second reading means for reading out the issue data that are the objects of issue from the issue data group from the storing means based on the attribution data changed by the changing means; and means for writing the issue data read out by the second reading means into the data memory in the portable storage medium.

19. A portable storage medium issuing method to issue a portable storage medium having a data memory and a control element to each individual of a plurality of individuals by writing respective issue data of each individual into the data memory, the issuing method comprising:

storing an issue data file comprising an issue data group of each individual containing data of a plurality of items and attribution data including data indicating whether each items of the issue data is an object of issue;

selecting whether the each items of issue data in the issue data file are to be made as objects of issue;

changing attribution data of the issue data file stored according to the result of selection; and writing the items of issue data that are selected as the objects of issue from the issue data group in the data memory in the portable storage medium based on the changed attribution data.

* * * * *